US009933785B2

(12) United States Patent
Lucet et al.

(10) Patent No.: US 9,933,785 B2
(45) Date of Patent: Apr. 3, 2018

(54) AUTOMATIC CONTROL METHOD FOR THE INSERTION AND THE EXTRACTION OF A VEHICLE INTO AND FROM A RECEIVING STATION, AND CONTROL DEVICE IMPLEMENTING A METHOD OF THIS KIND

(71) Applicant: COMMISSARIAT A L'ENERGIE ATOMIQUE ET AUX ENERGIES ALTERNATIVES, Paris (FR)

(72) Inventors: Eric Lucet, Paris (FR); Alain Micaelli, Fontenay-Aux-Roses (FR); François-Xavier Russotto, Meudon (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 9 days.

(21) Appl. No.: 15/183,646

(22) Filed: Jun. 15, 2016

(65) Prior Publication Data

US 2017/0003686 A1     Jan. 5, 2017

(30) Foreign Application Priority Data

Jul. 3, 2015   (FR) ...................... 15 01414

(51) Int. Cl.
*G05D 1/02* (2006.01)
*B62D 15/02* (2006.01)
(Continued)

(52) U.S. Cl.
CPC ........... *G05D 1/0225* (2013.01); *B60W 30/06* (2013.01); *B62D 13/00* (2013.01); *B62D 15/021* (2013.01);
(Continued)

(58) Field of Classification Search
CPC ............... G05D 1/0225; G05D 1/0212; G05D 2201/0205; B62D 13/06; B62D 15/027;
(Continued)

(56) References Cited

U.S. PATENT DOCUMENTS 7,154,385 B2 * 12/2006 Lee ...................... B62D 5/008
340/431
7,715,953 B2 * 5/2010 Shepard ................ B60D 1/58
280/400
(Continued)

FOREIGN PATENT DOCUMENTS

DE         103 50 923 A1    5/2005
DE    20 2013 011 728 U1    5/2014
(Continued)

*Primary Examiner* — Jason Holloway
(74) *Attorney, Agent, or Firm* — Baker Hostetler LLP

(57) ABSTRACT

A method comprises: a preliminary phase wherein a vehicle is aligned to be engaged toward a target position; a first phase wherein a reference trajectory is generated as a function of the status and target position of the vehicle, the status defined by the current position and orientation of the vehicle; a second phase wherein the reference trajectory being divided into sections, at the start of each section and before the vehicle begins a movement whether the reference trajectory can be followed is predicted as a function of imposed overall size constraints and estimated lateral and/or longitudinal slippages; a third phase, if the trajectory can be followed, wherein the turn angle of the wheels and the linear traction speed of the vehicle are controlled as a function of the status of the vehicle and the lateral and/or longitudinal slippages, to bring the centers of the wheels onto the reference trajectory.

16 Claims, 8 Drawing Sheets

(51) Int. Cl.
*B60W 30/06* (2006.01)
*B62D 13/00* (2006.01)

(52) U.S. Cl.
CPC . *B62D 15/0285* (2013.01); *G05D 2201/0205* (2013.01)

(58) Field of Classification Search
CPC ............ B62D 15/0285; B62D 15/0275; B62D 15/021; B62D 53/0871; B62D 13/00; B60W 30/06; B60R 2300/806; B60R 2300/8086; B60R 2300/808; G08G 1/168; B60T 2201/10; G06T 2207/30264
See application file for complete search history.

(56) References Cited

U.S. PATENT DOCUMENTS

| | | | |
|---|---|---|---|
| 8,862,321 B2* | 10/2014 | Moshchuk | B62D 5/0463 701/40 |
| 9,446,713 B2* | 9/2016 | Lu | B60R 1/002 |
| 9,708,000 B2* | 7/2017 | Hafner | B62D 13/06 |
| 2004/0215374 A1* | 10/2004 | Shepard | B60D 1/58 701/1 |
| 2006/0111820 A1 | 5/2006 | Goetting et al. | |
| 2010/0171828 A1* | 7/2010 | Ishii | B60R 1/00 348/135 |
| 2014/0085472 A1* | 3/2014 | Lu | B60R 1/002 348/148 |
| 2014/0249691 A1* | 9/2014 | Hafner | B62D 13/06 701/1 |
| 2014/0303849 A1* | 10/2014 | Hafner | B62D 13/06 701/42 |
| 2015/0115571 A1* | 4/2015 | Zhang | B60D 1/06 280/477 |
| 2016/0039456 A1* | 2/2016 | Lavoie | B62D 15/027 701/41 |
| 2016/0229451 A1* | 8/2016 | Raad | B62D 13/06 |
| 2017/0001566 A1* | 1/2017 | Lu | B60R 1/002 |

FOREIGN PATENT DOCUMENTS

| | | |
|---|---|---|
| EP | 2 181 898 A1 | 5/2010 |
| EP | 2 353 690 A1 | 8/2011 |
| FR | 3 021 938 A1 | 12/2015 |

* cited by examiner

AUTOMATIC CONTROL METHOD FOR THE INSERTION AND THE EXTRACTION OF A VEHICLE INTO AND FROM A RECEIVING STATION, AND CONTROL DEVICE IMPLEMENTING A METHOD OF THIS KIND

CROSS-REFERENCE TO RELATED APPLICATIONS

This application claims priority to foreign French patent application No. FR 1501414, filed on Jul. 3, 2015, the disclosures of which are incorporated by reference in their entirety.

FIELD OF THE INVENTION

The present invention concerns an automatic control method for the insertion and/or extraction of a vehicle into and from a receiving station. It also concerns a control device implementing a method of this kind. It is applied notably to the insertion or the extraction of container transporter lorries in receiving stations dedicated to loading and unloading containers.

BACKGROUND

Intra-port traffic consists in moving containers between loading/unloading points of cargo vessels and temporary storage areas (linked to road and rail transport infrastructures). The loading/unloading phases employ mobile lifting means (cranes) that load/unload mobile platforms used for transportation between the various points of the port. The accuracy of the positioning of the mobile platform when parking it is crucial to accelerating the loading/unloading task and making it safe.

In fact, the operations of parking a platform or trailer, propelled by means of a motorized cab, are difficult and take a long time, even if they are carried out by experienced drivers. Accidents can also occur, putting in hazard the equipment contained in the containers and also the persons involved in manoeuvres round about. To increase the productivity and the safety of port traffic, it is therefore necessary to accelerate the parking operations and to reduce greatly the number of accidents. To reduce these accidents, it is necessary to load and unload the containers accurately, which requires accurate positioning of the platforms in the parking spaces.

To improve the accuracy and the safety of the operations of loading and unloading containers onto and from platforms, there exist parking stations equipped with lateral walls. The problem is then to park a platform, trailer or long vehicle rapidly in a parking area to an accuracy a few centimeters or even one centimeter. Assisted parking or automatic parking is necessary for this purpose.

One application example is to insert automatically a vehicle 13 meters long and 3 meters wide carrying a payload of the order of 60 tons into a parking space with a positioning accuracy of the order of one centimeter from a starting position around fifteen meters or more away from the parking space, parking area.

A number of more or less automated parking assistance solutions are known, but they have drawbacks or are unsatisfactory, or are not able to address to the stated problem.

The document EP 2 353 690 B1 concerns the same context and the same type of vehicle, with the same types of movement and parking areas. The control of the vehicle is nevertheless entirely manual and there is no mention of any requirement for accurate movement.

In the document U.S. Pat. No. 8,862,321 B2 a vehicle is guided along an initial target path by commanding a steering actuator until the vehicle is located in a particular position required for parallel parking. However, the vehicle concerned is different from that with which the present invention is concerned, and has neither the same dimensions nor the same kinematic. The trajectory and the required position are different. This approach does not satisfy the accuracy requirements.

The document DE202013011728 raises the problem of autonomous navigation of a vehicle in an exterior environment where navigating a container transport lorry in the port environment is part of the possible application contexts. However, the solution described in that document is not suitable for complex movement kinematics. It proposes fixed markers in the environment that indicate the path to be followed with sensors on the vehicle that identify those markers. In particular it has the drawback of requiring markers on the path of the vehicle, which makes implementation more complex.

SUMMARY OF THE INVENTION

An object of the invention is notably to enable rapid and accurate parking of a vehicle in a receiving station. To this end, the invention consists in an automatic control method for the insertion of a vehicle into a receiving station and/or extraction from said station to a target position, said vehicle being subject to lateral and/or longitudinal slipping of the front wheels and the rear wheels during its movements, the method including the following phases:

a preliminary phase in which said vehicle is aligned to be engaged toward said target position;

a first phase in which a trajectory to be followed, called the reference trajectory, is generated as a function of the status of the vehicle and of the target position, said status being defined by the current position and the orientation of the vehicle;

a second phase in which, said reference trajectory being divided into sections, at the start of each section and before the vehicle begins a movement whether said reference trajectory can be followed is predicted as a function of imposed overall size constraints and estimated lateral and/or longitudinal slippages;

in a third phase, if said trajectory can be followed, the turn angle of said wheels and the linear traction speed of the vehicle are controlled as a function of the status of the vehicle and the lateral and/or longitudinal slippages, to bring the centres of said wheels onto the reference trajectory;

if the trajectory cannot be followed, a new alignment of the vehicle toward the target position is effected and a new reference trajectory is generated in accordance with the first phase.

In one particular embodiment, a plurality of geographical zones is defined between the initial position of the vehicle and the target position in which said imposed constraints are increasingly severe as said receiving station is approached.

The control law for the turn angles $\beta_f$, $\beta_r$ of the front and rear wheels is obtained by a process of constrained optimization of a function in which the variable is a vector u composed of the time-independent derivatives $\beta'_f$, $\beta'_r$ with respect to distance of the turn angles.

For example, the control law is advantageously based on a kinematic model of said vehicle taking account of the distance $d_f$, $d_r$ between the axis of the wheels and the steering axis at the front and at the rear of said vehicle.

For example, a vector u is calculated for each section of said trajectory.

For example, the constraints are a function of said imposed constraints depending on the overall size of said vehicle.

For example, the status of said vehicle and the slippages are obtained by observation of variables independent of said trajectory, said variables being:
- the average rotation speeds $\omega_f$ and $\omega_r$ of the front and rear wheels;
- the steering angles $\alpha_f$, $\alpha_r$ of said front and rear wheels;
- the derivatives with respect to time $\dot{\alpha}_f$, $\dot{\alpha}_r$ of said angles;
- the position $(x_m, y_m)$ and the angle $(\theta_m)$ of a mobile frame of reference (m) linked to said vehicle with respect to a fixed frame of reference (o).

For example, the vehicle is a container transporter, the receiving station being intended for loading and unloading containers, said container transporter having elevation movements producing a distance $d_f$, $d_r$ between the axis of the wheels and the steering axis at the front and at the rear.

The invention also concerns a control device for automatic control for the insertion of a vehicle into a receiving station and/or extraction from said station to a target position, said vehicle being subject to lateral and/or longitudinal slipping of the front wheels and the rear wheels during these movements, said device being adapted to be on board said vehicle and to be connected via appropriate interfaces at least to proprioceptive sensors, exteroceptive sensors and steering and traction motors of said vehicle, and including a computer implementing the method described above.

BRIEF DESCRIPTION OF THE DRAWINGS

Other features and advantages of the invention will appear in the light of the following description given with reference to the appended drawings, in which.

DETAILED DESCRIPTION

Figure 1A:
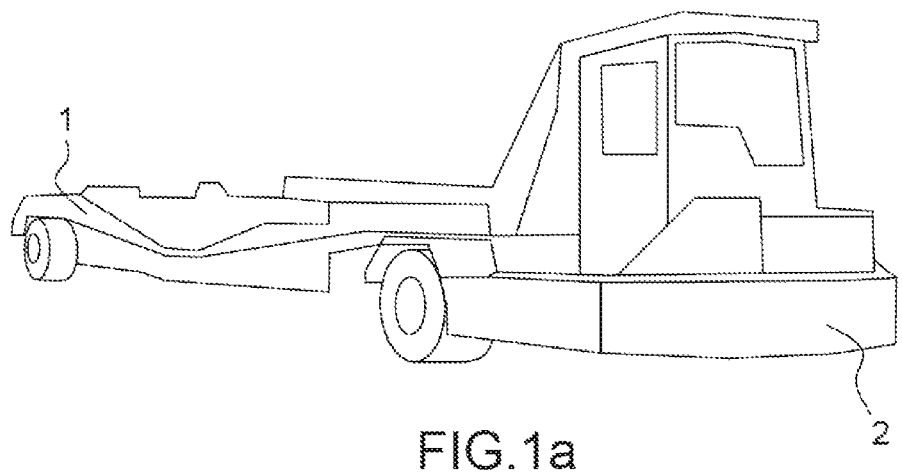
FIGS. 1a and 1b show one example of an application of the invention.
Figure 1B:
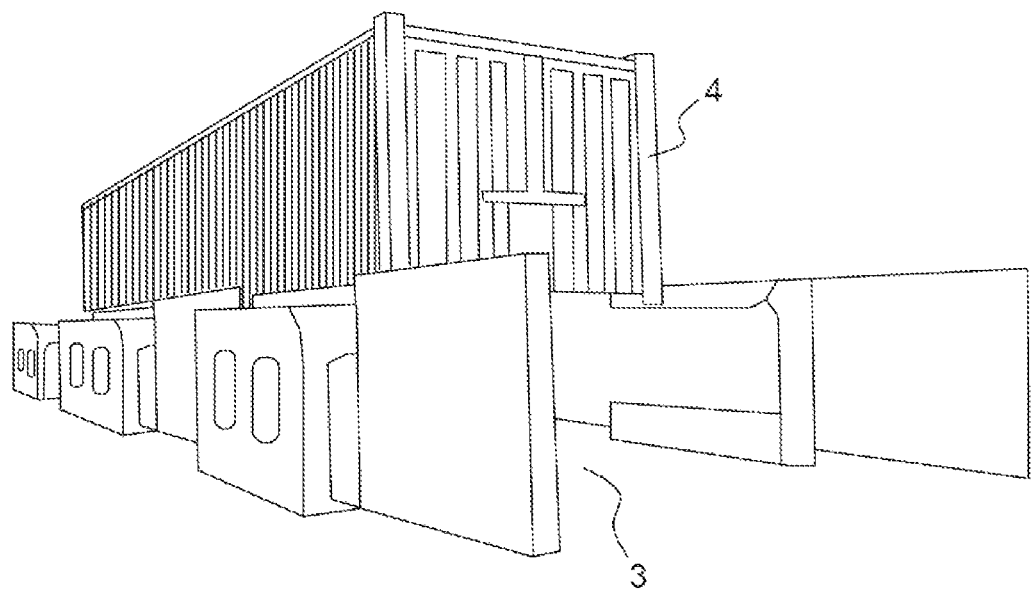

FIGS. 1a and 1b show one example of an application of the invention to a container transporter. FIG. 1a shows a mobile platform 1 pulled or pushed by a motorized cabin 2. In the FIG. 1a example, the trailer 1 is 13 meters long and 3 meters wide, for example. It is used in the traffic of the port to be loaded with a container the weight of which is as much as several tens of tons.

FIG. 1b shows a parking station 3 intended to accept the trailer 1. The parking station will be described in more detail later. In the FIG. 1 example, it supports a container 4 ready to be loaded onto the trailer 3 when the latter is parked in the station 3. The invention is described with one particular example of a parking area 3. It applies to other types of parking area, of course. More generally, it also applies to assistance with accurate parking, notably of long vehicles, in a context other than port traffic.

Figure 2A:
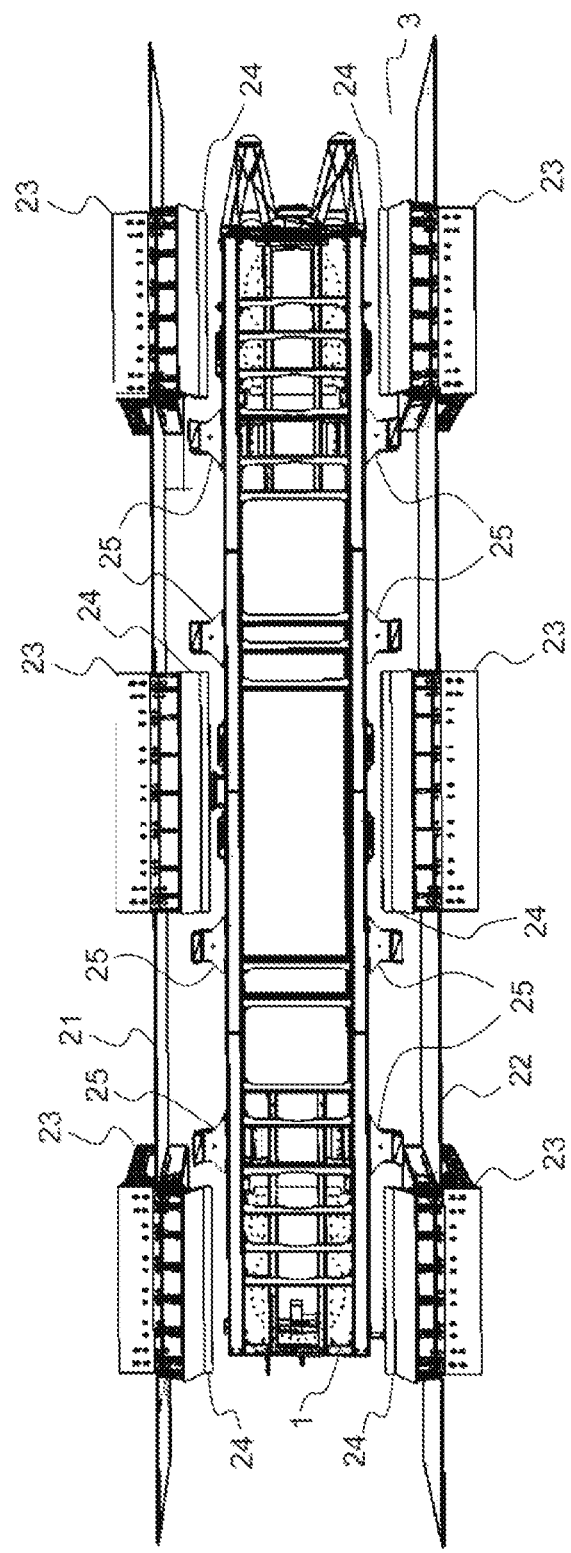
FIGS. 2a and 2b are more detailed views of this application respectively showing a vehicle parked in a receiving station and entering the station.
Figure 2B:
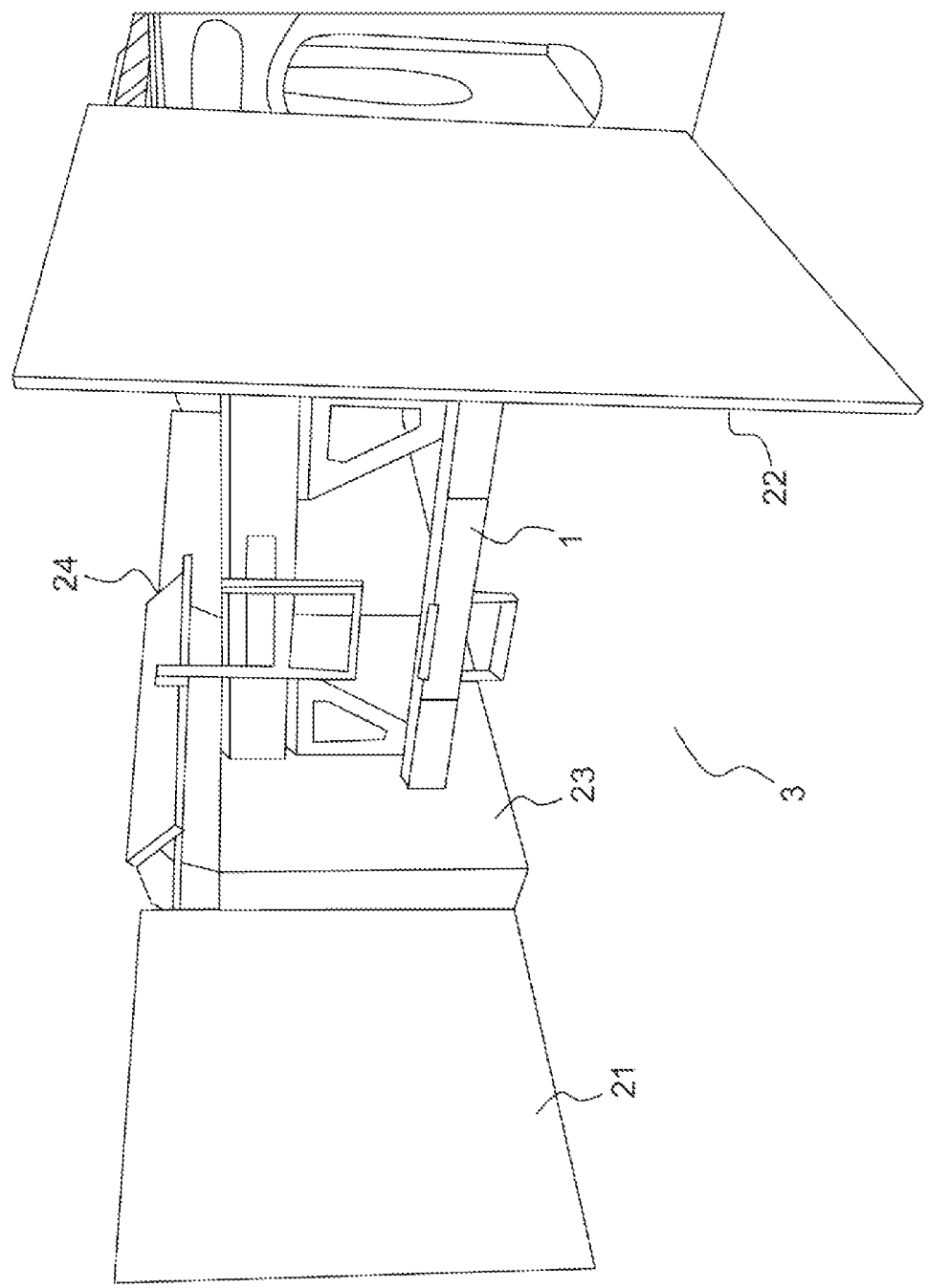

FIGS. 2a and 2b show in more detail the particular example of application of the invention evoked by FIGS. 1a and 1b. FIG. 2a shows a plan view of the trailer 1 parked in the parking station 3, which may be referred to hereinafter as the loading station, meaning that the trailer is loaded with or unloaded of its container in this station.

FIG. 2b shows a partial perspective view of the trailer 1 entering the station 3. This station includes two corrugated side walls 21, 22. The corrugations correspond to posts 23 with supports 24 at the top that project toward the inside of the walls. These supports 24 jointly support a container, the set of supports forming a receiving surface. In the FIG. 2a example there are three posts 23 on each side.

The trailer 1 includes a series of outwardly projecting supports 25 disposed laterally on each side. When parked, as shown by FIG. 2a, the supports 25 of the trailer are disposed between the posts. The trailer is then ready to be loaded.

The loading of a container 4 onto the trailer 1 is carried out in the following manner:
- the trailer is parked appropriately as shown in FIG. 2a;
- the container 4 is put down on the supports 24 of the station as shown in FIG. 1b;
- the supports 25 of the trailer being fixed to a structure that can be raised, the supports are raised with the structure until they reach the bottom of the container and then raised further so as to be above the level of the supports 24 of the station, the container then being supported only by the supports 25 of the trailer;
- when the supports 25 of the trailer have reached a given position, the trailer 1 loaded with the container may be removed from the station, the supports 25 supporting the container then passing over the supports 24 of the station.

The above steps are carried out in reverse order to unload the container.

The foregoing steps show that the trailer 1 must be placed accurately in the loading station 3, notably with regard to the side walls 21, 22. The required accuracy can be of the order of one centimeter or even less. To this requirement for accuracy is added a time constraint, as the trailer must be parked rapidly in the station 3.

Figure 3:
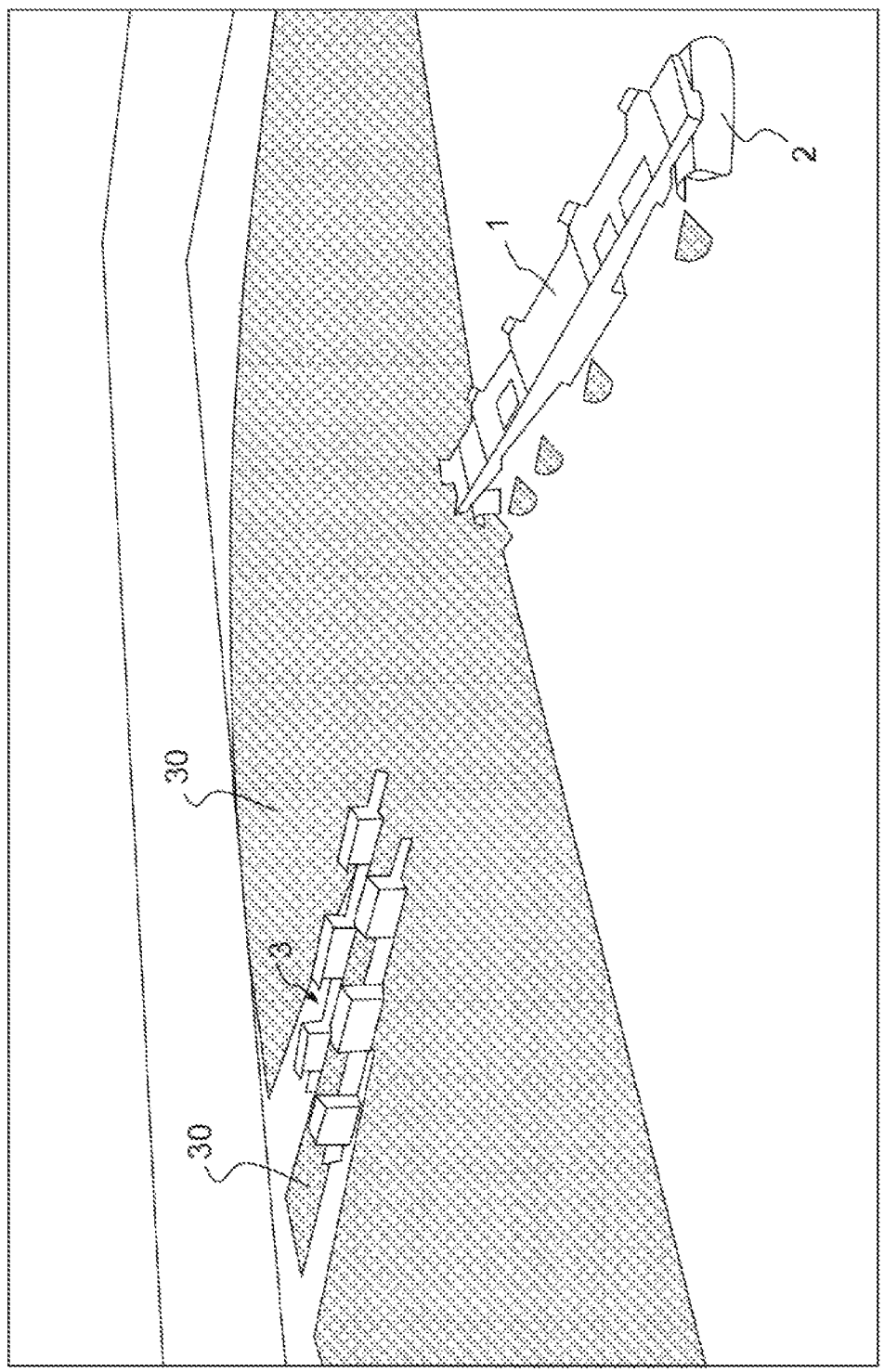
FIG. 3 shows the vehicle in the approach phase.

FIG. 3 shows the vehicle 1 in the phase of approaching the receiving station 3. The vehicle is initially parked in an area defined relative to the receiving station, the latter being covered by the detection beam 30 of a sensor placed on the vehicle, for example at the rear if the vehicle is parked moving in reverse. The vehicle is moved along a reference path by controlling steering and traction actuators until it is situated in a target position relative to the receiving station.

Figure 4:
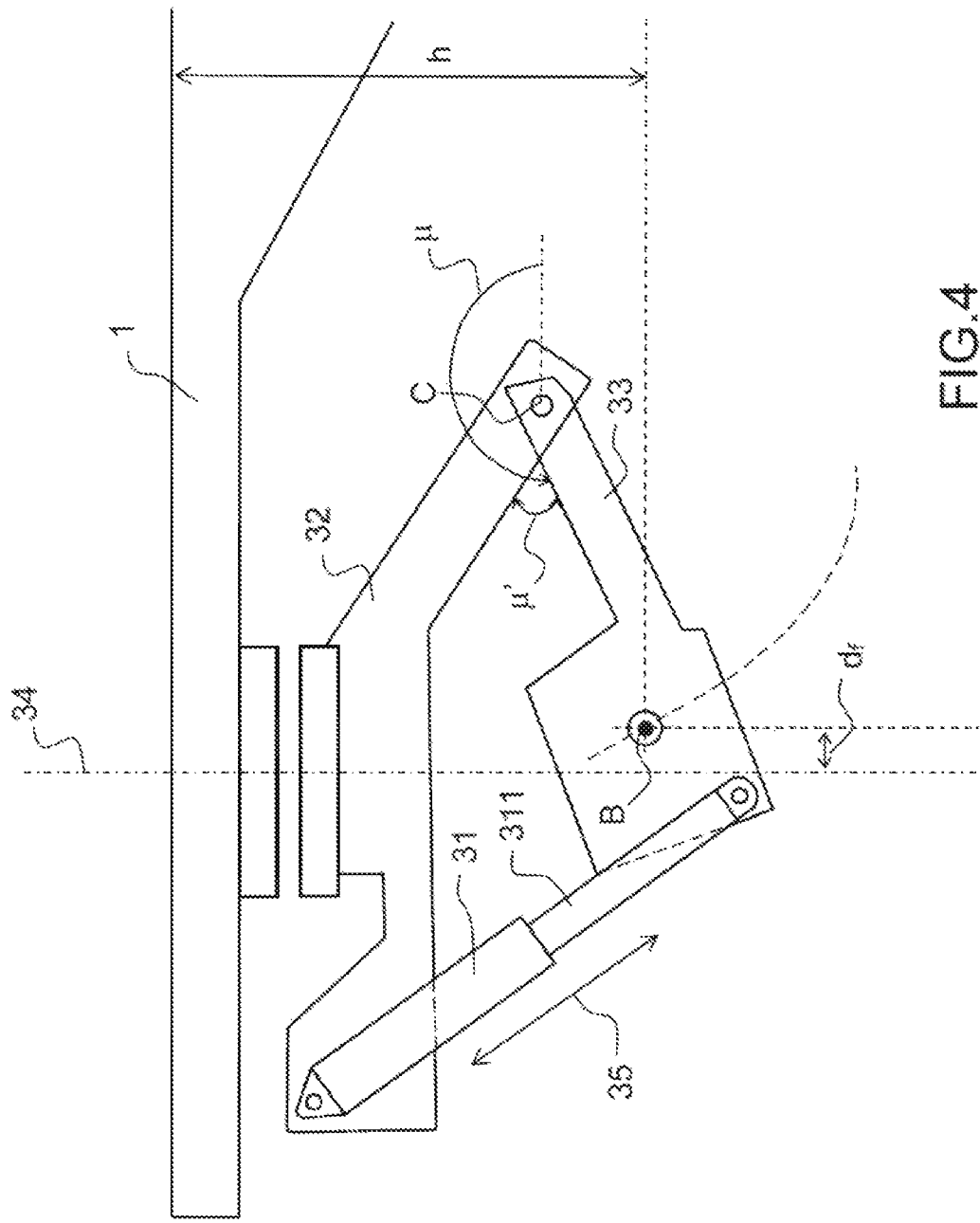
FIG. 4 is a partial view of one particular feature of a vehicle to which the invention applies.

FIG. 4 is a partial view of one particular feature of the kinematic of a container transporter vehicle 1 used in the context described above. FIG. 3 more particularly shows the lifting system that makes it possible to raise the supports 25 to place the containers on the supports 24 of the station or to remove them therefrom. Elevation is achieved by means of an actuator 31 coupled to a mechanical part 32 fixed relative to the trailer 1. One end of the actuator is mechanically fastened to this part with one degree of freedom in rotation. The actuator is also coupled to a mechanical part 33 rotatable about the axis of the wheels, identified by a dot B. The other end of the actuator is mechanically connected to an end of this mobile part with one degree of freedom. The other end of the mobile part 33 is mechanically coupled to the fixed part 32, also with one degree of freedom.

All these mechanical components 31, 32, 33 are rotatable in the plane perpendicular to the axis of the wheels, i.e. in the vertical plane.

Elevation is controlled by the travel 35 of the piston 311 of the actuator, this movement being controlled by a control device that is not shown. The extension stroke of the piston causes the mobile part 33 to tilt relative to the axis B, leading to an increase in the angle $\mu'$ between the fixed part 32 and the mobile part 33, and therefore to elevating the fixed part 32. As FIG. 4 shows, these rotation and elevation movements lead to an offset between the axis B of the wheels and the steering axis 34 of the trailer; this offset is denoted $d_f$ for the front wheels and will be referred to hereinafter as the track. The elevation mechanism and the track $d_r$ are of the same type for the rear wheels.

The existence of these tracks $d_f$, $d_r$ can increase the overall size when the vehicle is caused to turn, compromising the accuracy required for parking.

The invention takes account of this particular kinematic of an elevation type container transporter vehicle in which the track distance between the axis of the axle of the wheels and the steering axis varies as a function of the elevation height of the vehicle, more specifically the elevation of the supports. Taking the particular kinematic into account in this way enables more accurate trajectory tracking. To implement the method in accordance with the invention, a controller on board the vehicle automatically generates a trajectory to be followed relative to the target position in the receiving station.

Figure 5:
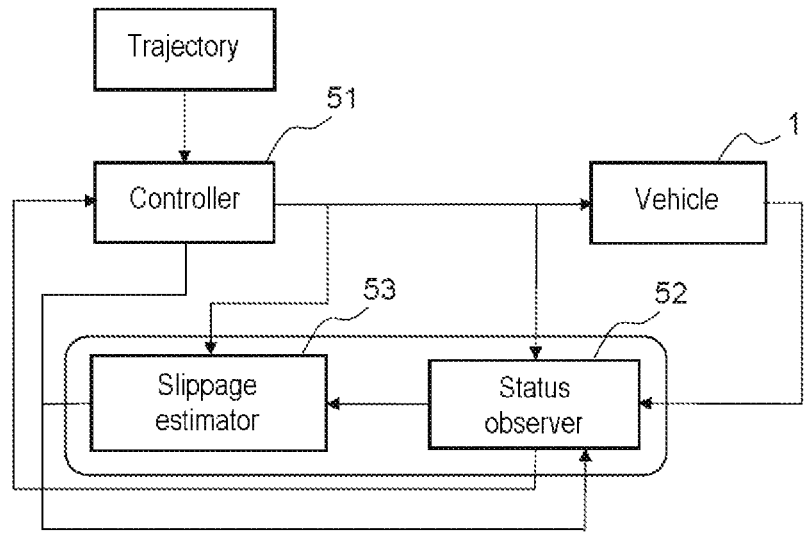
FIG. 5 shows a functional architecture for control of a vehicle in accordance with the invention.

FIG. 5 shows the control architecture for controlling the trajectory followed by the vehicle. It includes:
  the controller 51 using a kinematic model of the vehicle 1;
  at least one observer 52 of the lateral and longitudinal drift, corresponding to slippages, on the basis of a kinematic or dynamic 2D model, allowing real time or "on-line" correction of errors caused by these drifts;
  an estimator 53 estimating the slippages on the basis of the observations supplied by the observer 52.

This architecture, based on real time updating, facilitates the processing of the movements at low speed without penalizing the processing of movement at higher speed, by the correction of the slippages. The status of the vehicle and the slippages are observed on the basis of this model.

A control device in accordance with the invention incorporates the controller 51, the observer 52 and the estimator 53, these elements being functions implemented by a computer thereby executing the various phases of the method in accordance with the invention.

The control device, fixed to the vehicle, is connected via appropriate interfaces:
  to a power source supplying it with electrical power;
  to a perception system that provides position and orientation information relative to the receiving station, this system notably being described in patent application FR 1455049;
  to steering and traction motors of the vehicle, which the controller controls in terms of turn angle and linear traction speed;
  to proprioceptive sensors of the vehicle: coders measuring the angle of the front and rear steering axles, coders measuring the speed of the axles of the front and rear wheels and a distance sensor indicating the vertical position of the vehicle, this position being indicated by measuring the distance between a support and the ground, for example.

Figure 6:
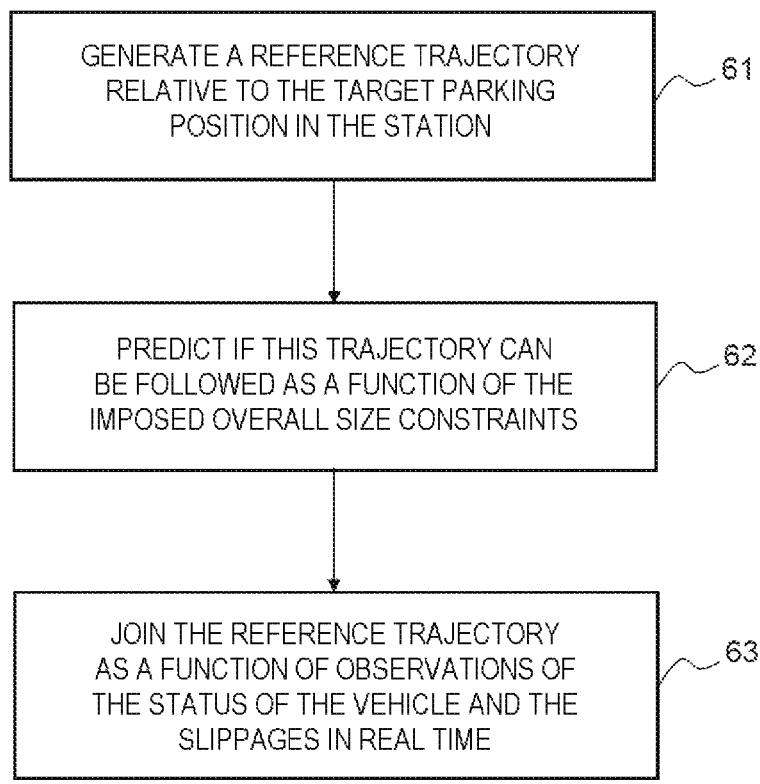
FIG. 6 shows phases of the method in accordance with the invention.

FIG. 6 shows the phases of the method in accordance with the invention implemented by an architecture of the FIG. 5 type, these phases being repeated all along the parking trajectory.

In a first phase 61 a trajectory to be followed, referred to as the reference trajectory, is generated as a function of the target parking position of the vehicle in the receiving station 3.

In a subsequent step 62, it is predicted before the vehicle moves whether it will be possible to follow this trajectory, depending on the imposed constraints. These constraints may be the overall size constraints imposed by the receiving station or the overall size constraints linked to the movements of the vehicle itself. If this reference trajectory does not enable the target parking position to be reached, it is abandoned and the vehicle undertakes a manoeuvre to align itself again towards the receiving station. This manoeuvre may be remote-controlled or effected manually by a driver. The process returns to the first phase 61 and a new reference trajectory is then predicted.

If the reference trajectory leads to the target parking position, in a third phase 63 the vehicle is controlled automatically to join and to follow the reference trajectory as a function of the observation of the status of the vehicle and the slippages in real time and in accordance with a constrained optimization process that will be described in detail later.

The verification phase 62 and the trajectory following phase 63 are executed regularly throughout the trajectory of the vehicle in accordance with a distance sampling process that will be described later.

Figure 7:
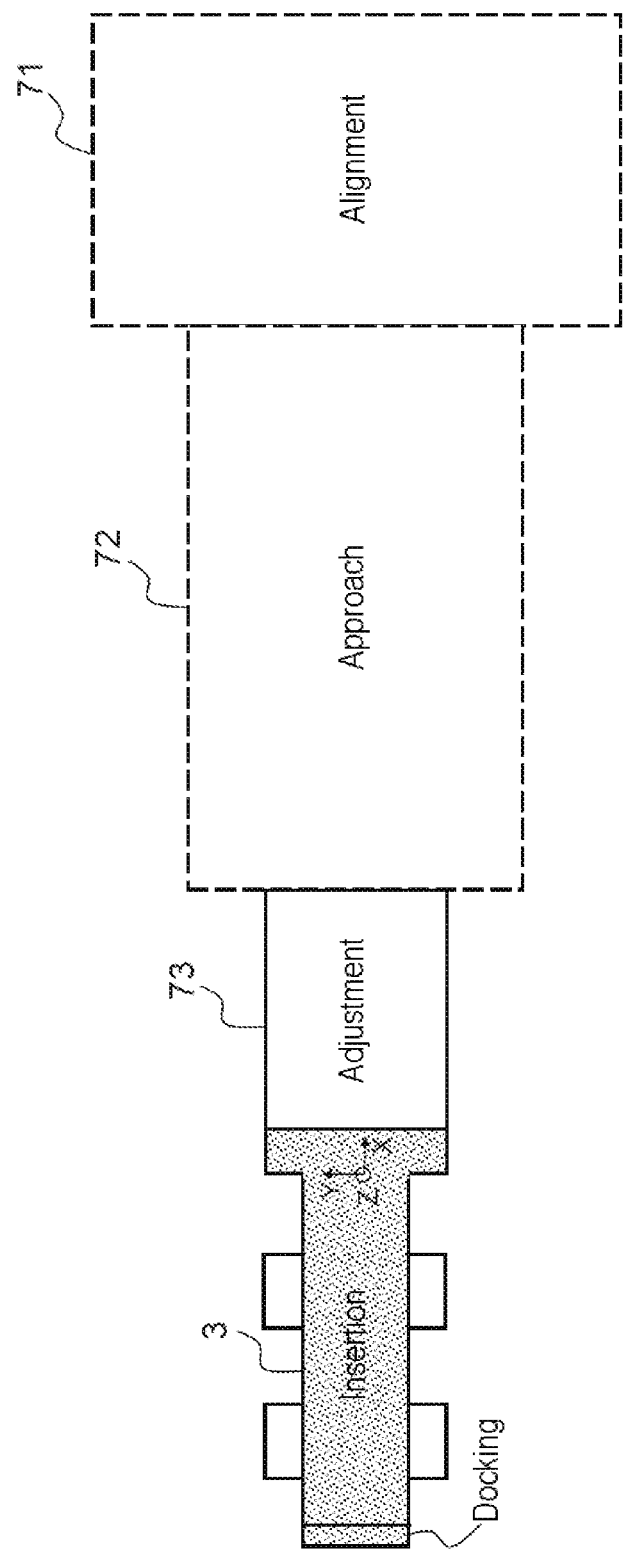
FIG. 7 shows defined geographical areas to which correspond constraints imposed on the vehicle.

FIG. 7 shows geographical areas 71, 72, 73 in front of the receiving station. The vehicle must pass through these geographical areas before engaging in the station. These areas are characterized by increasingly severe constraints in the process of constrained optimization of joining the reference trajectory as the station is approached.

A first area 71, farthest from the station, is intended for aligning the vehicle facing the station. The vehicle may be placed in this area non-automatically, for example manually by a driver. The initial trajectory of the vehicle is aligned on the entry of the station. As early as this area 71, the controller estimates the final position of the vehicle in the station as a function of the estimated trajectory.

A second area 72, called the approach area, follows on from the previous one with more severe overall size constraints on positioning. In other words, in this area 72 positioning errors smaller than for the previous area are acceptable.

A third area 73, called the adjustment area, is situated just in front of the entry of the station. The positioning errors must again be smaller.

Throughout the movement of the vehicle inside these areas, the final position is estimated and the controller can therefore verify that the vehicle will be in a position to reach the target position relative to the station without risk of colliding with it. To this end, overall size constraints are defined as a function of the area in which it is situated and the controller anticipates compliance therewith along the trajectory to be followed as far as the target position. If it is impossible to reach the desired position or in the event of non-detection of the receiving station 3 by the vehicle, a signal is sent by the controller, for example, for modification of the position of the vehicle manually by a driver or under remote control.

Figure 8:
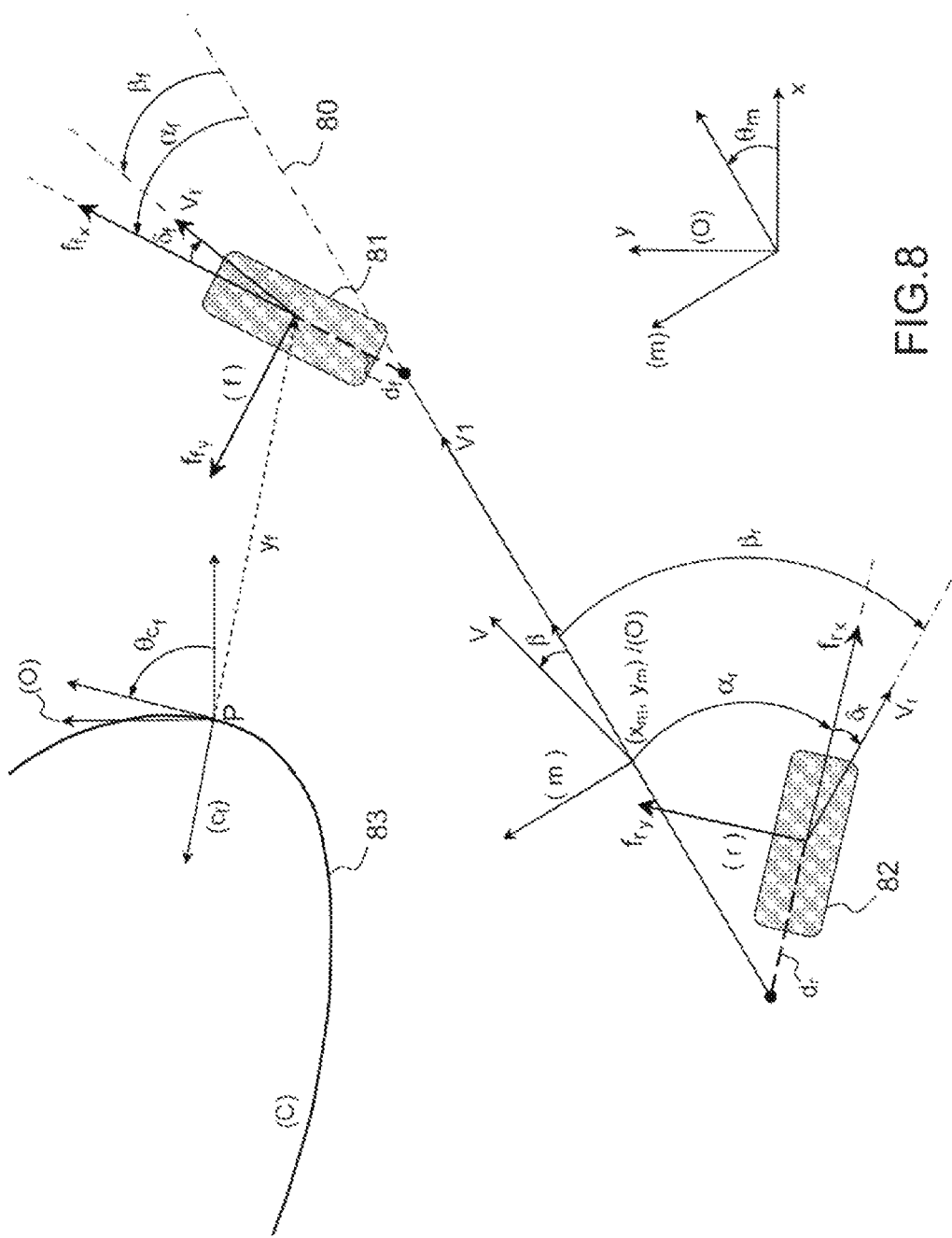
FIG. 8 shows an example of a kinematic model used by the invention.

FIG. 8 shows the 2D kinematic model of the vehicle previously referred to, facing a calculated trajectory 83 constructed as a function of a predictive model and the current position of the vehicle. It is used by the controller 51. This FIG. 8 model is an extension and adaptation of a model described in the document by A. Micaelli & C. Samson "Trajectory tracking for unicycle-type and two-steering-wheels mobile robots", Research Report RR-2097, INRIA, 1993.

In particular, the FIG. 8 design takes account of the front and rear tracks $d_f$, $d_r$ between the steering axis and the axis of the wheels. Taking these tracks into account in the model of the vehicle improves the accuracy of trajectory tracking.

For reasons of simplification, a single front wheel 81 represents the set of two front wheels and their axis. Similarly, a single rear wheel 82 represents the set of two rear wheels and their axis. A local frame of reference (f) is linked to the front wheels and a local frame of reference (r) is linked to the rear wheels. The trajectory of the vehicle is controlled on the basis of these frames of reference (f), (r), which must link the calculated reference trajectory 83.

For reasons of clarity, the centre of the local frame of reference (f) has not been represented on the trajectory 83, at the current point P. Likewise the frame of reference (r).

The front wheels 81 have a speed vector $V_f$ at an angle $\delta_f$ to the steering axis of the wheels. This angle $\delta_f$ represents the slippage of the wheels on the ground. The speed vector $V_f$ is at an angle $\beta_f$ to the axis 80 of the vehicle, equal to the steering angle $\alpha_f$ corrected by the slippage angle $\delta_f$. The same applies at the level of the rear wheels 82 for the speed vectors $V_r$ and the angles $\delta_r$, $\beta_r$, $\alpha_r$, respectively. The angles $\beta_f$ and $\beta_r$ express the turn angles of the front and rear wheels.

The resulting speed vector V of the vehicle is at an angle $\beta$ to the axis 80 of the vehicle. This angle $\beta$ expresses the resulting slippage of the vehicle, and in the absence of slippage $\beta=0$.

The direction of the axis 80 of the vehicle is marked in an absolute frame of reference (o) by an angle $\theta_m$. This angle $\theta_m$ also represents the angle between the mobile frame of reference (m) tied to the vehicle and the absolute frame of reference (o).

The centre of the front wheel 81 is at a distance $\gamma_f$, or lateral error, from the reference trajectory 83. To be more precise, by virtue of the constrained optimization process, this distance must be reduced so that the centre of the wheel 81 reaches the trajectory at a point P where a tangential local frame of reference $c_f$ is at an angle $\theta_{Cf}$ to the mobile frame of reference (o), this angle $\theta_{Cf}$ being the angle of the reference trajectory at the point P. Likewise, the centre of the rear wheel 82 must join a point on the trajectory 83 that is not shown.

On the basis of the model illustrated by FIG. 8, it is possible to deduce a linear model that will be used to generate the reference parking trajectory 83 of the vehicle. The linearization is effected around the established regime defined by:

$\theta_m = \theta_{Cf}$;

$\gamma_f = \gamma_r = 0$, $\gamma_r$ being the distance corresponding to the distance $\gamma_f$ for the rear wheel;

$\beta_f = \beta_r = 0$.

The linearization is therefore affected around a state in which the wheel is positioned on the trajectory 83 (the lateral errors $\gamma_f$, $\gamma_r$ being zero) and the slippages and wheel angles are zero, meaning that the direction and the turn angle relative to the axis 80 of the vehicle are zero.

Consider the state vector $$y = \begin{bmatrix} y_f \\ y_r \\ y'_f \\ y'_r \end{bmatrix}$$

$\gamma'_f$ and $\gamma'_r$ respectively being the derivative with respect to the curvilinear distance of the front lateral error $\gamma_f$ and the rear lateral error $\gamma_r$.

Consider also the state vector $$x = \begin{bmatrix} y_f \\ \theta_m \\ \beta_f \\ \beta_r \end{bmatrix}$$

It can be shown that there exist matrices A, P and B yielding the linearized model defined by the following equations:

$$y = Px \qquad (1)$$

$$y' = Ax + B\begin{bmatrix} \beta'_f \\ \beta'_r \end{bmatrix} = AP^{-1}y + Bu \qquad (2)$$

y' being the derivative with respect to the curvilinear distance of y, $\beta'_f$ and $\beta'_r$ being the derivatives with respect to the curvilinear distance of $\beta_f$ and $\beta_r$, respectively, the entry vector $$u = \begin{bmatrix} \beta'_f \\ \beta'_r \end{bmatrix}$$

therefore expressing the evolution of the turn angles of the front and rear wheels as a function of the movement of the vehicle.

The matrices A, P and B incorporate the equations of the kinematic model illustrated by FIG. 8 taking account of the tracks $d_f$, $d_r$.

For observation of the status of the vehicle, there may be used for example the vector:

$$Xm = \begin{bmatrix} \theta_m \\ x_m \\ y_m \end{bmatrix}$$

indicating the position and the orientation of the vehicle relative to the absolute frame of reference (o), $\theta_m$ being the angle of the mobile frame of reference (m) tied to the vehicle relative to the frame of reference (o) as indicated above, $x_m$ and $y_m$ being the coordinates of the mobile frame of reference (m) in the frame of reference (o).

The speeds and the positions of the local frames of reference (f) and (r) respectively tied to the front and rear wheels are used for the observations of slippage. The rotation speed of the wheels will be more particularly used to observe the longitudinal slippages.

On the trajectory 83 there is defined a number $n_{step}$ of curvilinear sections, or steps, of length S. On the basis of the linearized model of the equations (1) and (2), the state matrices of the continuous system are $A_c = AP^{-1}$ and $B_c = B$. By discretization of an increment of length S along the trajectory, the matrices of the system then become $A_d$ and $B_d$ given by the following system of equations (3):

$$\begin{bmatrix} y_1 \\ y_2 \\ \vdots \\ y_k \\ \vdots \\ y_{n_{step}} \end{bmatrix} = \mathcal{A} y_0 + \mathcal{B} \begin{bmatrix} u_0 \\ u_1 \\ \vdots \\ u_{k-1} \\ \vdots \\ u_{n_{step}-1} \end{bmatrix} \quad (4)$$

$I_4$ being the 4×4 identity matrix. A power calculation on $A_c$ shows that $A_c^3$ is equal to 0. To consider forward and reverse movement, the calculations are done for S>0 and S<0.

The predicted states of the vectors y are calculated from the known current state $y_0$ and the known matrices $A_d$ and $B_d$.

The prediction on the $n_{step}$ successive steps leads to the following equation (4):

$$\begin{cases} A_d = e^{A_c S} = I_4 + S A_c + \frac{S}{2} A_c^2 \\ B_d = e^{A_c S} \int_0^S e^{-A_c s} ds B_c = S\left(I_4 + \frac{S}{2} A_c + \frac{S^2}{6} A_c^2\right) B_c \end{cases}$$

expressed in a more synthetic matter by the following equation:

$$Y = \mathcal{A} y_0 + \mathcal{B} U \quad (5)$$

Equations (4) and (5) show that on each step of distance k an entry command $u_k$ is defined.

In this constrained optimization process for tracking the trajectory 83, the criterion to be optimized is for example a quadratic function of the predicted state vector Y and the control input U. This criterion, denoted crit, is expressed by the following equation:

$$\text{crit} = \tfrac{1}{2} Y^T Q Y + \tfrac{1}{2} U^T \mathcal{R} U \quad (6)$$

in which Q and $\mathcal{R}$ are the $4n_{step} \times 4n_{step}$ weight matrices and $2n_{step} \times 2n_{step}$ weight matrices for the state and the control of the vehicle, respectively.

On the basis of equations (5) and (6), the criterion may be expressed by the following equation (7):

$$\text{crit} = \tfrac{1}{2} U^T (\mathcal{B}^T Q \mathcal{B} + \mathcal{R}) U + y_0 \mathcal{A}^T Q \mathcal{B} U \quad (7)$$

in which the parameter dependent on $y_0$ is expressed separately.

The expressions of the state constraints for a given vehicle are defined by the above equation (8). More specifically, in accordance with a first approximation, the vehicle is modelled as a rectangle the front side and the rear side of which are respectively at a distance $D_f$ from the front axle along the longitudinal axis 80. The fact that these front and rear distances remain within a tolerance range $\delta_{gap}$ around the trajectory can be expressed by the following equation:

$$-\begin{bmatrix} \delta_{gap} \\ \delta_{gap} \end{bmatrix} \leq \begin{bmatrix} 1 & -d_f + D_f & -d_f & 0 \\ 1 & -d_f - D_r & -d_f & 0 \end{bmatrix} \times \leq \begin{bmatrix} \delta_{gap} \\ \delta_{gap} \end{bmatrix} \quad (8)$$

The tolerance range $\delta_{gap}$ is increasingly constraining as a function of the areas 71, 72, 73, 3 on approaching closer to the target parking position.

This constraint can further be written in the following matrix form:

$$D y + d \geq 0_{4 \times 1} \quad (9)$$

Extended to all the $n_{step}$ predicted states and written as a function of future control inputs, this expression becomes:

$$\mathcal{D} \mathcal{B} U + \sigma_{gap} + \mathcal{A} y_0 \geq 0_{4 n_{step} \times 1} \quad (10)$$

where:

$\mathcal{D}$ is a matrix of $n_{step}$ blocks disposed on the diagonal, each block consisting in a matrix D according to equation (9).

$\sigma_{gap} = \delta_{gap} 1_{4 n_{step} \times 1}$.

The control input vector U is then obtained as a result of solving the following system in which the first member relates to the criterion to be optimized and the second member to the constraint:

$$\begin{cases} \min_U \tfrac{1}{2} U^T (\mathcal{B}^T Q \mathcal{B} + \mathcal{R}) U + y_0 A^T Q \mathcal{B} U \\ \mathcal{D} \mathcal{B} U + \sigma_{gap} + \mathcal{A} y_0 \geq 0_{4 n_{step} \times 1} \end{cases} \quad (11)$$

The control law is advantageously defined independently of time and speed.

To go to the real time control law of the actuators, time must then be introduced. Extracting $$\begin{bmatrix} \beta'_f \\ \beta'_r \end{bmatrix} = u_0,$$

the first element solution $U_1$ yields the control law:

$$\begin{bmatrix} \dot{\beta}_f \\ \dot{\beta}_r \end{bmatrix} = v_f u_0 \quad (12)$$

$v_f$ being the linear speed of the front wheels.

There is thus obtained a standard system of constrained optimization.

The control law defined by equation (12) yields the derivative with respect to time of the turn angles, and therefore indicates to the controller the turn commands to be applied. This information is then transmitted via appropriate interfaces to impart the movements to the wheels.

The observation function is advantageously independent of the trajectory to be followed and therefore not impacted by tracking errors. It performs three types of observations. These observations enable correction in real time of the lateral and longitudinal drifts relative to the reference trajectory.

A first type of observation performs the observation of the status of the vehicle notably defined by its position, its orientation and its speed. This status may be obtained in the conventional way by extended Kalman filtering.

A second type of observation performs the observation of the longitudinal slippages of the vehicle and more particularly of the front and rear wheels. In practical terms, this observation can be carried out by observing the apparent radius of the wheels, the apparent radius being calculated as a function of the distance travelled allowing for the longitudinal slippages. The apparent radius is larger or smaller than the real radius of the wheels, except in the absence of slippage, in which case it is equal. The comparison between the apparent radius and the real radius therefore makes it possible to observe the longitudinal slippage.

A third type of observation performs the observation of the lateral slippages $\delta_f$, $\delta_r$ shown in FIG. 5.

For these various observations, proprioceptive state variables specific to the vehicle are measured, notably:
the average rotation speeds $\omega_f$ and $\omega_r$ of the front and rear wheels;
the front and rear steering angles $\alpha_f$, $\alpha_r$ shown in FIG. 5;
the derivatives $\dot{\alpha}_f$, $\dot{\alpha}_r$ with respect to time of those angles, i.e. the steering angular speed.

The exteroceptive variables measured are notably: the components of the vector $$X_m = \begin{bmatrix} \theta_m \\ x_m \\ y_m \end{bmatrix}$$

indicating the position and the orientation of the vehicle relative to the absolute frame of reference (o).

The difference between the measurements of the proprioceptive variables, indicating the theoretical status of the vehicle, and the measurements of the exteroceptive variables, taking account of the slippages of the vehicle, enable observation of the status of the vehicle, for example by extended Kalman filtering.

The longitudinal and lateral slippages may be estimated from these observations, as notably shown by the slippage estimator 53 using the observation data 52 in the functional architecture shown in FIG. 5.

The invention has been described for a container transporter type lorry or trailer vehicle. It applies to all types of vehicles necessitating automatic driving toward a target position that are subject to longitudinal and/or lateral slippages when they move toward that target position.

The invention claimed is:

1. An automatic control method for insertion of a vehicle into a receiving station and/or extraction from said station to a target position, said vehicle being subject to lateral and/or longitudinal slipping of front wheels and rear wheels during its movements, said method including the following phases:
a preliminary phase wherein said vehicle is aligned to be engaged toward said target position;
a first phase wherein a reference trajectory to be followed is generated with a vehicle control device as a function of a status of the vehicle and of the target position, said status being defined by a current position and an orientation of the vehicle;
a second phase wherein, said reference trajectory being divided into sections, at a start of each section and before the vehicle begins a movement, a determination of whether said reference trajectory can be followed is predicted with the vehicle control device as a function of imposed overall size constraints and estimated lateral and/or longitudinal slippages;
in a third phase, if said trajectory can be followed, a turn angle of said wheels and a linear traction speed of the vehicle are controlled with the vehicle control device as a function of the status of the vehicle and lateral and/or longitudinal slippages of the vehicle, to bring the centres of said wheels onto the reference trajectory; and
if the trajectory cannot be followed, a new alignment of the vehicle toward the target position is effected and a new reference trajectory is generated with the vehicle control device in accordance with the first phase.

2. The method according to claim 1, wherein a plurality of geographical zones are defined between an initial position of the vehicle and the target position in which said imposed constraints are increasingly severe as said receiving station is approached.

3. The method according to claim 1, wherein a control law for steering angles $\beta_f$, $\beta_r$ of the front and rear wheels is obtained by a process of constrained optimization of a function in which a variable is a vector u composed of time-independent derivatives $\beta'_f$, $\beta'_r$ with respect to distance of the turn angles.

4. The method according to claim 3, wherein said control law is based on a kinematic model of said vehicle taking account of a distance between an axis of the wheels and a steering axis at a front and at a rear of said vehicle.

5. The method according to claim 3, wherein the vector u is calculated for each section of said trajectory.

6. The method according to claim 3, wherein the constraints are a function of said imposed constraints depending on an overall size of said vehicle.

7. The method according to claim 1, wherein the status of said vehicle and the slippages are obtained by observation of variables independent of said trajectory, said variables being:
average rotation speeds $\omega_f$ and $\omega_r$ of the front and rear wheels;
steering angles of said front and rear wheels $\alpha_f$, $\alpha_r$;
derivatives with respect to time $\dot{\alpha}_f$, $\dot{\alpha}_r$ of said steering angles; and
a position and an angle of a mobile frame of reference linked to said vehicle with respect to a fixed frame of reference.

8. The method according to claim 1, wherein the vehicle is a container transporter, the receiving station being configured for loading and unloading containers, said container transporter having elevation movements producing a distance between the axis of the wheels and a steering axis at the front and at the rear.

9. A vehicle control device for an automatic control of the insertion of a vehicle into a receiving station and/or extraction from said station to a target position, said vehicle being subject to lateral and/or longitudinal slipping of front wheels and rear wheels during these movements, said vehicle control device being implemented on board said vehicle and to be connected via appropriate interfaces at least to proprioceptive sensors, exteroceptive sensors and steering and traction motors of said vehicle, said vehicle control device including a computer implementing the following phases:
a preliminary phase wherein said vehicle is aligned to be engaged toward said target position;
a first phase wherein a reference trajectory to be followed is generated with the vehicle control device as a function of a status of the vehicle and of the target position, said status being defined by a current position and an orientation of the vehicle;

a second phase wherein, said reference trajectory being divided into sections, at a start of each section and before the vehicle begins a movement, a determination of whether said reference trajectory can be followed is predicted with the vehicle control device as a function of imposed overall size constraints and estimated lateral and/or longitudinal slippages;

in a third phase, if said trajectory can be followed, a turn angle of said wheels and a linear traction speed of the vehicle are controlled with the vehicle control device as a function of the status of the vehicle and lateral and/or longitudinal slippages of the vehicle, to bring the centres of said wheels onto the reference trajectory; and if the trajectory cannot be followed, a new alignment of the vehicle toward the target position is effected and a new reference trajectory is generated with the vehicle control device in accordance with the first phase.

10. The vehicle control device according to claim 9, wherein a plurality of geographical zones are defined between an initial position of the vehicle and the target position in which said imposed constraints are increasingly severe as said receiving station is approached.

11. The vehicle control device according to claim 9, wherein a control law for steering angles $\beta_f$, $\beta_r$ of the front and rear wheels is obtained by a process of constrained optimization of a function in which a variable is a vector u composed of time-independent derivatives $\beta'_f$, $\beta'_r$ with respect to distance of the turn angles.

12. The vehicle control device according to claim 11, wherein said control law is based on a kinematic model of said vehicle taking account of a distance between an axis of the wheels and a steering axis at a front and at a rear of said vehicle.

13. The vehicle control device according to claim 11, wherein the vector u is calculated for each section of said trajectory.

14. The vehicle control device according to claim 11, wherein the constraints are a function of said imposed constraints depending on an overall size of said vehicle.

15. The vehicle control device according to claim 9, wherein the status of said vehicle and the slippages are obtained by observation of variables independent of said trajectory, said variables being:

average rotation speeds $\omega_f$ and $\omega_r$ of the front and rear wheels;

steering angles of said front and rear wheels $\alpha_f$, $\alpha_r$;

derivatives with respect to time $\dot{\alpha}_f$, $\dot{\alpha}_r$ of said steering angles; and a position and an angle of a mobile frame of reference linked to said vehicle with respect to a fixed frame of reference.

16. The vehicle control device according to claim 9, wherein the vehicle is a container transporter, the receiving station being configured for loading and unloading containers, said container transporter having elevation movements producing a distance between the axis of the wheels and a steering axis at the front and at the rear.

* * * * *